United States Patent [19]
Constable

[11] Patent Number: 6,035,141
[45] Date of Patent: Mar. 7, 2000

[54] OPTICAL DATA RECORDING CIRCUIT FOR A FILM CAMERA

[75] Inventor: Douglas W. Constable, Rochester, N.Y.

[73] Assignee: Eastman Kodak Company, Rochester, N.Y.

[21] Appl. No.: 09/251,033

[22] Filed: Feb. 18, 1999

[51] Int. Cl.[7] ........................................... G03B 7/26
[52] U.S. Cl. ............................ 396/206; 306/6; 306/317
[58] Field of Search ................................. 396/6, 205, 206, 396/317

[56] References Cited

U.S. PATENT DOCUMENTS

| | | |
|---|---|---|
| 4,112,444 | 9/1978 | Yonemoto et al. . |
| 4,199,242 | 4/1980 | Hosomizu et al. . |
| 4,332,445 | 6/1982 | Hosono . |
| 5,574,337 | 11/1996 | Dunsmore ..................................... 396/6 |
| 5,752,084 | 5/1998 | Motomura et al. .......................... 396/6 |
| 5,784,658 | 7/1998 | Hata et al. . |
| 5,875,357 | 2/1999 | Motomura et al. .......................... 396/6 |

*Primary Examiner*—Russell Adams
*Attorney, Agent, or Firm*—Francis H. Boos, Jr.

[57] ABSTRACT

An optical data recording circuit suitably adapted for a low cost, one-time-use camera in which an LED optical recording device is connected via a switch device from one terminal of a battery supply to the base of an oscillator transistor in an oscillator charging circuit. The base of the oscillator transistor is connected via a resistor to the other terminal of the battery supply and via an oscillator charger circuit ON/OFF switch and secondary winding of the charger step-up transformer to the first terminal of the battery supply. The battery is such that its no-load output voltage is sufficient to illuminate the LED. When the switch device is closed to initiate recording of an optical data bit on film in the camera, the LED is illuminated from the battery no-load output voltage if the ON/OFF switch is open and the charging circuit is not running. If the ON/OFF is being held closed while taking a picture, the LED is then illuminated by pulses from the oscillator circuit step-up transformer, preferably by flyback pulses from the transformer secondary winding to the base of the oscillator transistor.

4 Claims, 4 Drawing Sheets

OPTICAL DATA RECORDING CIRCUIT FOR A FILM CAMERA

FIELD OF THE INVENTION

The present invention relates to the field of cameras having optical data recording circuits for optically recording data, such as print aspect ratio encodements as well as other types of data, on film in the camera.

BACKGROUND OF THE INVENTION

One-time-use cameras with film pre-loaded by the camera manufacturer and typically including a flash illumination feature are very popular with consumers. It is important for the continued commercial success of these cameras that they provide good quality, reliable operation at the lowest possible product cost. One-time-use cameras are currently available that utilize Advance Photo System (APS) film and that have provision for providing a selection of desired print aspect ratios. APS specifications include provision for optically recording (or not recording) data bits (exposed blips) in the film margin adjacent each image frame that signal the photofinisher which print aspect ratio to apply. These blips are colloquially referred to as "fat bits". In the specification, there are three available print aspect ratios, H, P and C, which roughly correspond to HDTV, panoramic and conventional 35 mm aspect ratios, respectively. No recorded fat bit specifies the H aspect ratio, a single recorded fat bit specifies the P aspect ratio and two recorded fat bits specify the C aspect ratio.

In commonly assigned, co-pending U.S. application Ser. No. 09/149,688, there is shown a flash circuit for a one-time-use camera in combination with a data bit recording circuit for recording fat bits on the film. The data recording circuit employs a light emitting diode (LED) which is powered from the main flash capacitor of the flash circuit. The flash circuit is designed to maintain a minimum voltage on the flash capacitor substantially equal to the battery supply voltage to insure that there is sufficient voltage to illuminate the LED even if the flash capacitor is fully self-discharged following a long period of non-use of the camera. While effective for its purpose, this arrangement requires that the data recording circuit include a relatively costly high-voltage-rated transistor and a zener diode for protecting the LED from the high voltage of the flash capacitor when fully charged and for limiting the LED current to the relatively low level of 5 to 10 milliamps needed for illumination of the LED.

In copending, commonly assigned U.S. Application Serial Number [Atty. Docket 78752], there is disclosed a data bit recording circuit for use with a "one touch" flash charger circuit that utilizes battery voltage, either directly from the battery or, alternatively, from a battery-charged auxiliary storage capacitor, to power the LED rather than the main flash charge capacitor. This arrangement permits elimination of the high-voltage-rated transistor and zener diode from the recording circuit and thereby lessens the cost of the circuit. However, it does require the use of an additional capacitor to provide the backup power source for the LED and the arrangement does cause some small amount of power drain on the battery to maintain the capacitor at the no-load battery voltage level. Additionally, the circuit disclosed in aforementioned copending application Serial Number [Atty. Docket 78752] is designed for use with a "one touch" flash circuit which starts the flash charging circuit upon momentary closure of a charge start switch, the charge circuit continuing to charge until feedback from the flash capacitor indicates full charge is reached. An additional feedback from the flash illumination circuit automatically restarts the charge circuit each time a picture is taken. While definitely a convenience to the camera user, the illustrated "one touch" circuit is relatively costly. As a result, it may be desirable for product cost reasons to utilize a conventional manually operated charging circuit which charges only so long as a charger start switch is held closed by the camera user. However, if a data recording circuit powered directly by a battery source having a sufficient output voltage to effect illumination of the LED data recording device is used with a manual charging circuit powered by the same battery, it is possible in some cases that a user may take a picture while still holding the charger ON/OFF switch closed. In this case, the charger load on the battery would reduce the battery output voltage and render it insufficient to effect illumination of the LED.

U.S. Pat. No. 5,784,658—Hata et al., discloses an LED data bit recording circuit operated in conjunction with a manually actuated flash charger circuit powered by a 1.5 volt battery source. Because the 1.5 volt battery is insufficient to effect illumination of the LED, data recording is accomplished by pulses generated in the primary winding of the charger circuit step-up transformer. This necessarily requires that the charger circuit be running when data recording is effected since the primary winding pulses are the only source of effective power to operate the LED recording device (or devices). The disclosed circuit arrangement, thus requires the combination of a switching transistor and a synchronizing switch to actuate the charger oscillator transistor in order to generate the primary winding pules needed to operate the LED data recording device. The switching transistor is used to bypass the manual charger ON/OFF switch and the synchronizing switch responds to initiation of a flash illumination to enable the switching transistor during the transitory time the flash trigger switch is closed. While useful for data recording purposes, it requires extra parts to ensure the required starting of the charger circuit in order to effect data recording. It is thus preferred normally to operate the data recording circuit directly from a battery source having an output voltage that is sufficient to effect illumination of the LED recording device.

Therefore, there still remains a need for a data recording circuit to optically record data on the film that further reduces the parts count, and therefore the cost of the data recording feature, and that operates reliably to record the data bits even when operating battery voltage is reduced due to load conditions on the battery, such as during operation of the camera flash charging circuit.

SUMMARY OF THE INVENTION

In accordance with the invention, therefore, there is provided an optical data recording circuit for optically recording data on film in a camera of the type having an oscillator charging circuit, a flash illumination circuit and a battery operatively coupled to the oscillator charging circuit, wherein the oscillator charging circuit includes a step-up transformer and an oscillator transistor with an emitter, base and collector. The data recording circuit is characterized by a circuit path including an optical recording device and a switch device coupled between a first terminal of the battery and the base of the oscillator transistor, the battery having a no-load output voltage sufficient to illuminate the optical recording device. The oscillator charging circuit includes a resistor connected from the base of the oscillator transistor to a second terminal of the battery and includes an oscillator start switch connected from the base of the oscillator transistor to the step-up transformer and to the first terminal of the battery. With this arrangement, upon closure of the switch device, if the oscillator charging circuit is not operating, illumination of the optical recording device is effected by the no-load output voltage of the battery through the resistor and, if the oscillation circuit is operating, illumination of the optical recording device is effected by pulses generated in the step-up transformer.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
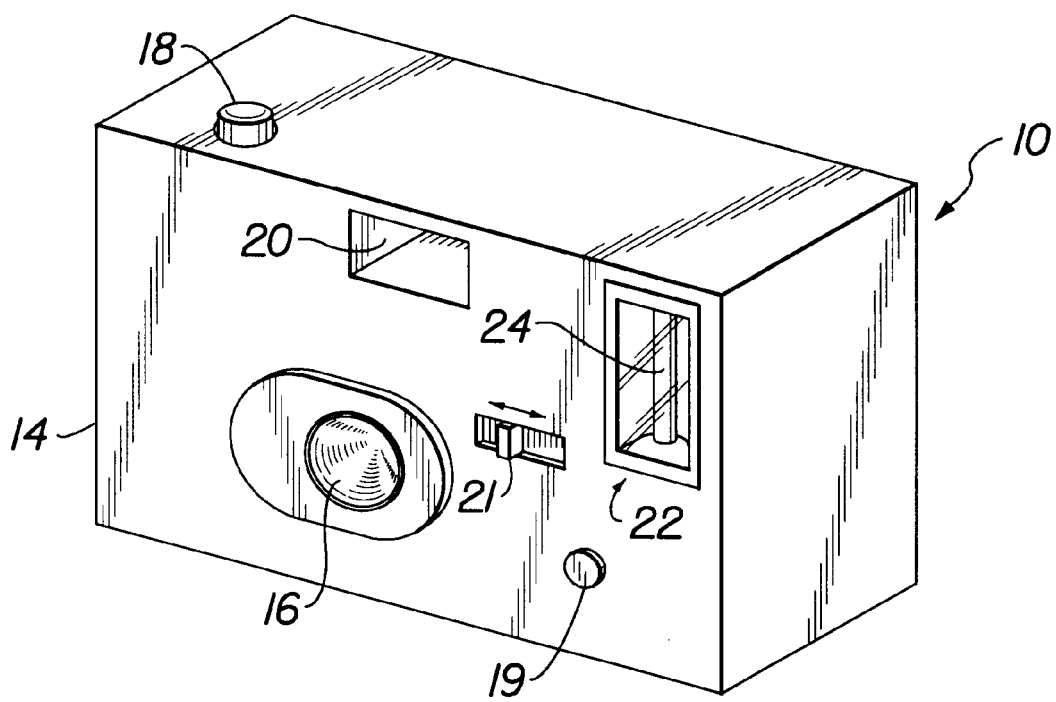
FIG. 1 is a diagrammatic illustration of a single use camera in which the present invention is particularly useful.

Referring to FIG. 1, there is depicted a low cost, single use camera 10 including a body 14, an optical taking lens system 16, a viewfinder 20 and a flash device 22 including a flash tube 24. A shutter button 18 initiates a picture taking sequence which opens and closes a shutter (not shown) to expose the film through optical system 16. Opening of the shutter also actuates an internal flash sync switch to a closed position, thereby initiating supplemental scene illumination from flash tube 24. A "one-touch" button 19, operable by the camera user, initiates a flash charging cycle to charge a flash capacitor to provide energy for operation of the flash tube 24. The camera is pointed at the intended subject with the aid of viewfinder 20. A switch 21 is provided for selection by the camera user of image frame aspect ratio data to be recorded on the film as will be described in more detail below.

Figure 2:
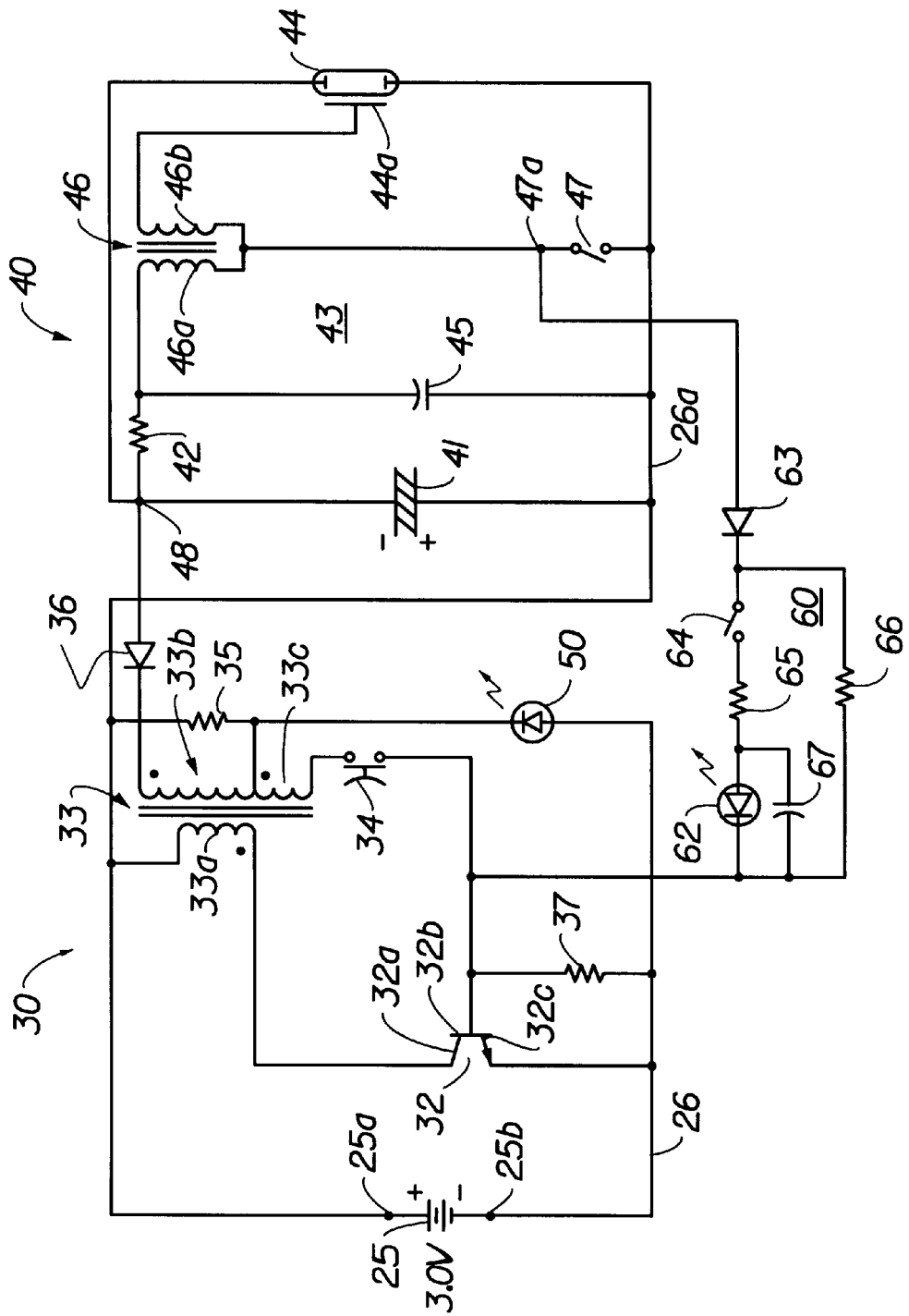
FIG. 2 is a circuit diagram of an embodiment of the data recording circuit of the invention adapted for use with separate battery return lines for the flash charger and flash illumination circuits in the camera.

Referring to FIG. 2, battery 25 is a 3 volt battery (or a pair or 1.5 volt batteries) having positive and negative terminals 25a and 25b operatively coupled to an oscillator charging circuit 30 which comprising an oscillator transistor 32, a step-up transformer 33 and a rectifier diode 36. Oscillator transistor 32 has its collector 32a connected through primary winding 33a of the step-up transformer to the positive output voltage terminal 25a of the battery and has its emitter 32c connected to the negative battery output terminal 25b. The base 32b of the transistor is connected to the positive battery terminal via a first circuit path comprising an oscillator ON/OFF switch 34, a segment 33c of transformer secondary winding 33b and a current limiting resistor 35 and to the negative terminal of the battery via a second circuit path comprising resistor 37. Flash illumination circuit 40 comprises a main flash charge capacitor 41, isolation resistor 42, a trigger circuit 43 and flash tube 44. Trigger circuit 43 comprises a trigger capacitor 45, step-up transformer 46 and a synchronizing trigger switch 47 typically actuated by the camera shutter release mechanism (not shown). The flash ready light comprising LED 50 is connected from current limiting resistor 35 to the negative terminal 25b of the battery.

The operation of the circuit of FIG. 2 as thus far described is as follows. When switch 34 is closed by the camera user to initiate charging of the flash capacitor 41, a positive bias is applied to the base of transistor 32 which turns the transistor ON thereby initiating oscillation in the oscillator circuit 30. The circuit will continue oscillating only so long as the switch 34 is held closed. Stepped-up negative-going pulses in the secondary of transformer 33 are rectified by diode 36 to charge main flash capacitor to a negative voltage at terminal 48. When the charge on capacitor 41 reaches the desired level, for example −300 volts, negative-going pulses in the transformer winding segment 35c reach an amplitude that is sufficient to cause LED 50 to conduct, thereby illuminating the LED and providing an indication that the flash capacitor 41 is fully charged. Normally, the camera user will see the "ready" indication and will release the switch 34 to stop the oscillation and flash charging operation.

When a picture is taken by the camera user pressing the shutter button 18 (FIG. 1), trigger switch 47 is closed connecting terminal 47a via common line 26a to the positive terminal 25a of the battery. Capacitor 45, which is charged to the same negative voltage as flash capacitor 41, is immediately discharged through the primary winding 46a of transformer 46 producing a high voltage pulse on secondary winding 46b which is applied to trigger terminal 44a of the flash tube 44 to initiate the flash illumination.

In accordance with a first preferred embodiment of the invention, a data recording circuit 60 comprises a first circuit path including flash switch trigger switch 47 and an optical data recording device, LED 62, connected from the positive battery terminal 25a via line 26a to the base 32b of oscillating transistor 32. In the illustrated circuit, there is also included in this first circuit path, a blocking diode 63 to protect the recording circuit from the high negative voltage flash capacitor 41, a selector switch 64 for enabling and disabling the data recording operation and a current limiting resistor 65 that establishes the 10–15 milliamps of current through the data recording LED 62 during the momentary time that switch 47 is closed. Data recording circuit 60 also includes a high value resistor to stabilize the DC voltage across LED 62 during it's normally OFF condition and a capacitor 67 to prevent noise voltages generated while charger circuit is operating from inadvertently causing illumination of LED 62.

The operation of the data recording circuit 60 is as follows assuming that selection switch is closed to cause recording of a data bit on the camera film. It is also assumed that the camera user has previously charged the flash capacitor 41 and has released the charger ON/OFF switch in response to the "ready" indication from ready light (LED) 50 and thus the oscillator circuit is OFF. When a picture taking sequence is initiated, trigger switch 47 is closed momentarily by action of the shutter release mechanism (not shown). This causes the LED 62 circuit path to be connected from positive battery terminal 25b via positive common line 26 directly to the negative battery terminal 25b via resistor 37 and negative common line 26. An LED used to illuminate a data bit on film in a camera generally requires from 5 to 10 milliamps to illuminate and this, in turn, establishes about a 1.6 volt drop across the LED. Resistor 65 in series with the LED determines the current. Consequently, the voltage applied to the LED must be in excess of 1.5 volts to effect reliable illumination of the LED. Since battery 25 is a 3 volt battery, there is more than sufficient voltage applied to the data recording circuit for illumination of the LED 62 when the oscillator charging circuit is not running and the battery is under a no load condition.

However, it possible for the camera user to attempt to take a picture while still holding the charger ON/OFF switch closed. In this event, when the trigger switch 47 is momentarily closed for flash initiation the oscillator charging circuit is running, by definition in this assumption, and the loaded output voltage of the battery typically drops to about 1.5 volts which is insufficient to effect illumination of the LED as described above. By virtue of the present invention in which the LED circuit path is returned to the base of transistor 32 rather than to the negative common line 26, a supply of negative-going flyback pulses in the base feedback circuit from the secondary winding of transformer 33 is available on the cathode of LED 62 and is sufficient to effect illumination of the LED. As a consequence, with a simple circuit comprising a minimum of component parts, recording of the data bit on the film is assured whether or not the oscillator charging circuit is running at the time the picture is taken and the data bit recording is required.

Figure 3:
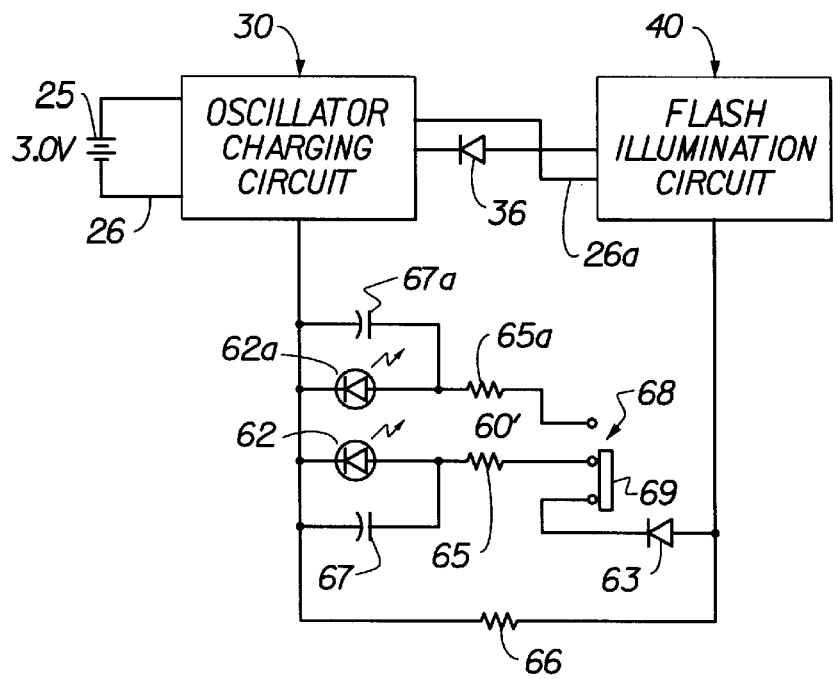
FIG. 3 is a modification of the of the data recording circuit of FIG. 2 allowing for selection of plural data recording encodements.

In FIG. 3, an alternative embodiment of the data bit recording circuit 60' is illustrated with battery 25, oscillator charging circuit 30 and flash illumination circuit 40 being the same as in FIG. 2. In the modified data recording circuit 60', an additional LED 62a and current limiting resistor 65a and capacitor 67a are included to provide for recording an additional data bit. A modified data selector switch 68 includes a three position connector 69 (shown in the middle position) actuated by user movement of slide switch 21 on the camera to select illumination of both LEDs, one LED or no LED illumination. In all other respects the circuit of FIG. 3 is the same as that shown in FIG. 2.

Figure 4:
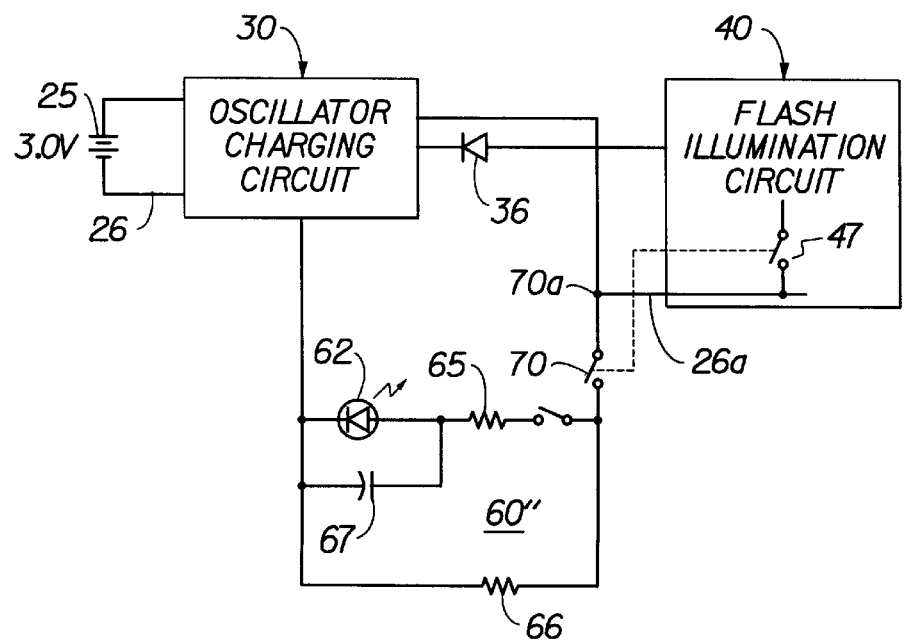
FIG. 4 is a second embodiment of the data recording circuit of the invention illustrating an alternative triggering mechanism for initiating the data recording function.

In FIG. 4, a modified circuit arrangement for data recording circuit 60" is shown in which battery 25 and oscillator charging circuit 30 are the same as in FIG. 2. The data recording circuit 60", however, is modified to the extent of the use of a separate switch device 70 in the LED circuit path connected directly to the common line 26a and ganged with the synchronizing trigger switch 47 to be closed in conjunction with closing of trigger switch 47 to initiate a flash illumination. This arrangement eliminates the need for the high voltage blocking diode 63 in the arrangement of FIG. 2. In all other respects, data recording circuit 60" is the same as shown in FIG. 2 and like components carry the same reference numerals. It will be appreciated by those skilled in the art that other arrangements for closing the switch device to initiate illumination of LED 62 in conjunction with initiating flash illumination without necessarily tying the switch device mechanically to the flash trigger switch 46.

Figure 5:
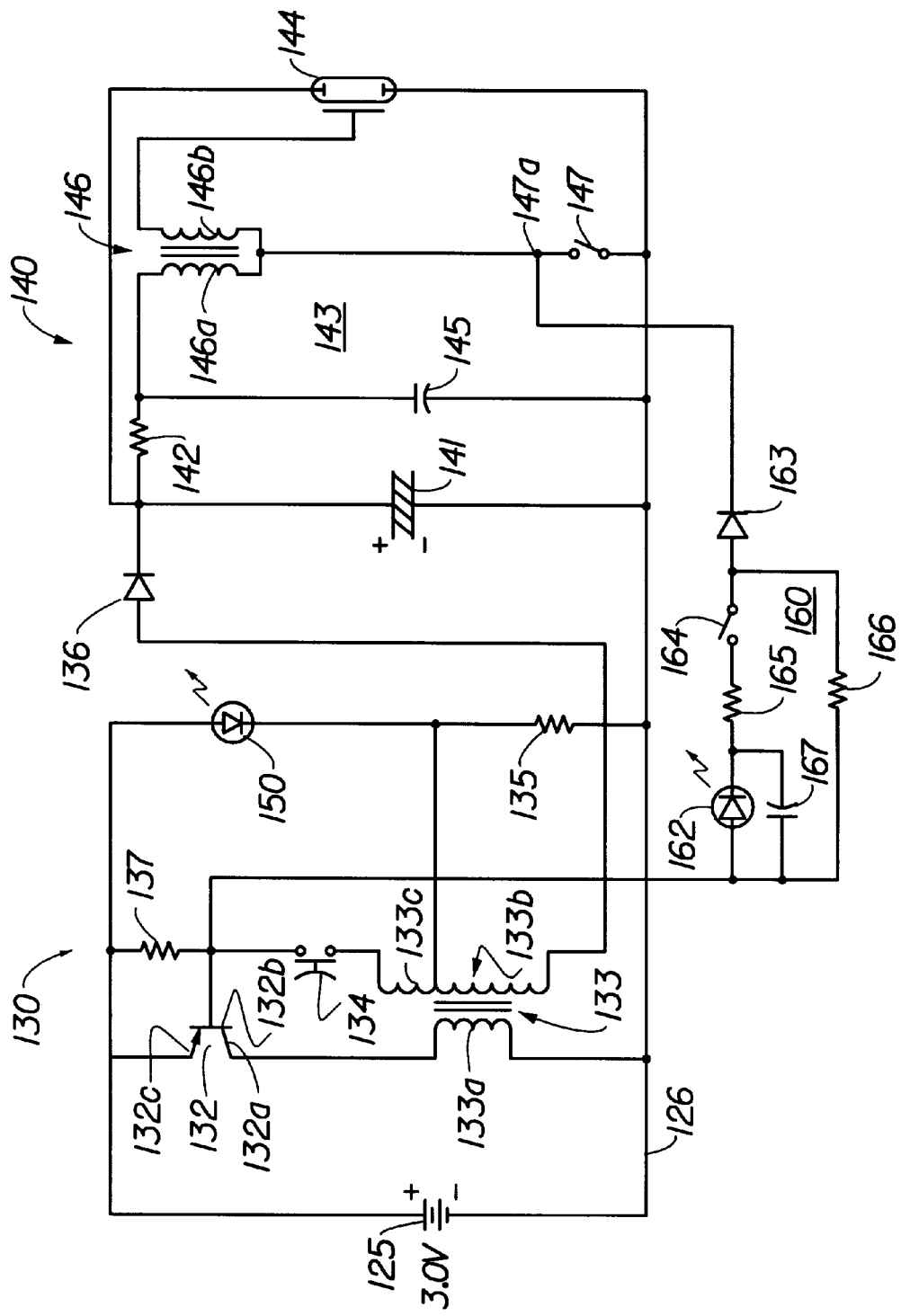
FIG. 5 is a third embodiment of the data recording circuit of the invention adapted for use with a common battery return line for the flash charger and flash illumination circuits.

It is not necessary for practice of the invention that separate common return lines be used for the oscillator charging circuit and the flash illumination circuit such as is shown in FIG. 2. Referring to FIG. 5, an arrangement is shown similar to that of FIG. 2 with functionally similar components bearing the same reference numeral preceded by the numeral "1". The difference is that polarities of rectifier diode 136 and other components are reversed appropriately in known manner to charge main flash capacitor 141 positively. Additionally, a common return line 126 is provided to the negative terminal of battery 125 for both oscillator charging circuit 130 and flash illumination circuit 140. Common return line flash circuits of this type are known in the art. Flash circuit 120 is shown here to illustrate how a data recording circuit 160 in accordance with the invention may be modified to work with split common line flash circuits. The LED circuit path of recording circuit 160 is now connected with the anode side of LED 162 connected to the base of oscillator transistor 132 and, at the other end of the LED circuit path, the cathode of blocking diode is connected to terminal 147a of trigger switch 147. In a similar fashion as with the data recording circuit 62 of FIG. 2, when trigger switch 147 is closed upon taking a picture, LED 162 is illuminated directly from the no-load output voltage of battery 125 if the ON/OFF switch 134 is open and the oscillator charging circuit is not running; but, if the switch is being held closed by the camera user, the now positive-going flyback pulses in the secondary of transformer 133 provide the power needed to effect illumination of LED 162.

It is apparent that what has been described is a simple optical data recording circuit for a camera with a minimum of parts count and therefore of low cost that reliably operates to record optical bits irrespective of whether the oscillator charging circuit is running during the recording process. The invention has been described in detail with particular reference to certain preferred embodiments thereof, but it will be understood that variations and modifications can be effected within the spirit and scope of the invention.

What is claimed is:

1. An optical data recording circuit for optically recording data on film in a camera of the type having an oscillator charging circuit, a flash illumination circuit and a battery operatively coupled to the oscillator charging circuit, the oscillator charging circuit including a step-up transformer and an oscillator transistor with an emitter, base and collector; the data recording circuit characterized by:

a circuit path including an optical recording device and a switch device coupled between a first terminal of the battery and the base of the oscillator transistor, the battery having a no-load output voltage sufficient to illuminate the optical recording device;

the oscillator charging circuit including a resistor connected from the base of the oscillator transistor to a second terminal of the battery and an oscillator start switch connected from the base of the oscillator transistor to said step-up transformer and to said first terminal of the battery;

whereby, upon closure of said switch device, if said oscillator charging circuit is not operating, illumination of said optical recording device is effected by said no-load output voltage of the battery through said resistor and, if said oscillation circuit is operating, illumination of said optical recording device is effected by pulses generated in said step-up transformer.

2. The circuit of claim 1 wherein said optical recording device is a light emitting diode.

3. The circuit of claim 1 wherein illumination of said optical recording device is effected while said oscillation recording circuit is running by pulses generated in a secondary winding of said step-up transformer.

4. The circuit of claim 1 wherein said illumination is effected by flyback pulses in said transformer secondary winding.

* * * * *